(No Model.)
L. W. HYDE & A. H. SEAMAN.
SHEET FLIER FOR PRINTING MACHINES.
No. 324,939. Patented Aug. 25, 1885.
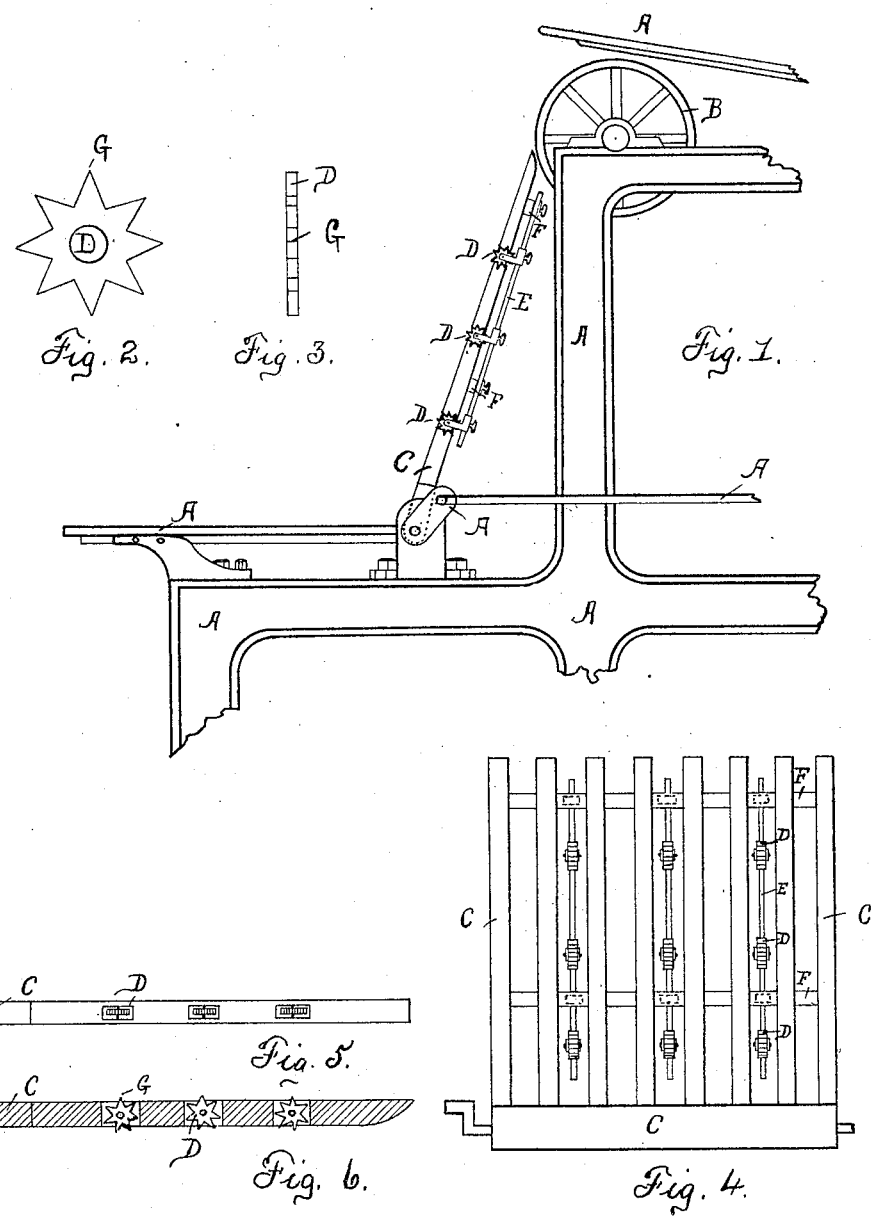
Witnesses.
W. E. Deane
John F. Victory
Lewis W. Hyde
Albert H. Seaman
Inventors.
by Lewis W. Hyde Jr.
Attorney.

United States Patent Office.

LEWIS W. HYDE, OF BROOKLYN, AND ALBERT H. SEAMAN, OF NEW YORK, N. Y.

SHEET-FLIER FOR PRINTING-MACHINES.

SPECIFICATION forming part of Letters Patent No. 324,939, dated August 25, 1885.

Application filed September 15, 1884. (No model.)

*To all whom it may concern:*

Be it known that we, LEWIS W. HYDE, of the city of Brooklyn, county of Kings, and State of New York, and ALBERT H. SEAMAN, of the city, county, and State of New York, have invented a new and useful Improvement in Sheet-Fliers for Printing-Machines, of which the following is a specification.

Our invention consists in providing the flier with rollers (in any suitable number) having around their outer surface projecting points or edges, over which the printed sheet passes, the roller turning and presenting to the paper sheet always an exposure of points or edges merely. When a printed sheet glides over bars in fliers, smutty lines frequently result, thereby rendering an attendant necessary to wipe the bars whenever inked and smutted from the printed paper in its passage. This result (although in a less degree) followed the use of simple friction-rollers, whether their surface was smooth or roughened. By the use of the pointed rollers this tendency to smuttiness is obviated, as they present but small portions of their surface to the paper, and they are also less liable to stick or remain stationary as the sheet passes over them. The service of an attendant is by their use dispensed with, as well as the use of tapes, the sheet more surely and properly laid on the pile, and frictional electricity avoided.

In the accompanying drawings, Figure 1 is a side view of a portion of a printing-press with flier having our friction device. Fig. 2 is a side view of the friction device alone—to wit, a pointed roller. Fig. 3 is a face view of same. Fig. 4 is a face view or elevation of the flier with friction device adjustably attached. Fig. 5 is a face view of one finger of a flier, which illustrates another mode of attaching rollers to the flier, differing from Fig. 4 in that the rollers are inserted into the finger. Fig. 6 is a sectional side view of same.

A represents the printing-press.

B is the cylinder, which delivers the printed sheet to the flier.

C is the flier.

D represents the carrying-rollers, over which the sheet passes down the flier previous to the laying of the same in the pile by the motion of the flier, as usual.

Rods E may be used to carry the rollers by means of supports having forked ends and adjustable, as to distance apart on said rods, by sleeves and thumb-screws, as shown. The rollers revolve as the sheet passes, presenting the points to the sheet, so that the sheet touches only thereon.

E represents rods for supporting the rollers, attached to the back of the bars to carrying-bars F, attachable thereto by sleeve and thumb-screws, as shown.

The points to the rollers are marked G. They may be made of any suitable form, size, or material, the object being to present but small points for the sheet of paper to touch upon.

The rollers may be attached to the flier between the bars, as desired.

We do not desire to claim herein any mode of attachment whereby the rollers are secured to the flier or bars, nor the combination of simple friction-rollers with a printing-press flier, as such invention is claimed by us in application No. 136,012, filed June 25, 1885.

What we claim as new, and desire to secure by Letters Patent of the United States, is—

The printing-press flier C, consisting of a series of fingers framed together and provided with series of rollers, D, having points or projections G around their face, and arranged with their axes transverse to the fingers, substantially as shown and described.

LEWIS W. HYDE.
A. H. SEAMAN.

Witnesses:
GEO. E. STEMMERMAN,
A. A. IRVINE.